(12) United States Patent
Avisse

(10) Patent No.: US 6,314,815 B1
(45) Date of Patent: Nov. 13, 2001

(54) PRESSURE SENSOR WITH COMPENSATION FOR NULL SHIFT NON-LINEARITY AT VERY LOW TEMPERATURES

(75) Inventor: Jean-Bernard Avisse, Castelneau de Medoc (FR)

(73) Assignee: Societe Nationale d'Etude et de Construction de Moteurs d'Aviation - S.N.E.C.M.A., Paris (FR)

( * ) Notice: Subject to any disclaimer, the term of this patent is extended or adjusted under 35 U.S.C. 154(b) by 0 days.

(21) Appl. No.: 09/424,161
(22) PCT Filed: Mar. 19, 1999
(86) PCT No.: PCT/FR99/00637
§ 371 Date: Feb. 23, 2000
§ 102(e) Date: Feb. 23, 2000
(87) PCT Pub. No.: WO99/49288
PCT Pub. Date: Sep. 30, 1999

(30) Foreign Application Priority Data

Mar. 20, 1998 (FR) .................................................. 98 03437

(51) Int. Cl.⁷ .............................. G01L 19/04; G01L 9/04
(52) U.S. Cl. ................................................ 73/708; 73/720
(58) Field of Search .............................. 73/708, 720, 727, 73/726, 766, 719, 862.63; 338/4, 3; 340/870.38, 870.42; 374/143, 173

(56) References Cited

U.S. PATENT DOCUMENTS

| | | | | |
|---|---|---|---|---|
| 3,645,136 | * | 2/1972 | Calhoun ................................. | 73/393 |
| 4,333,349 | * | 6/1982 | Mallon et al. ......................... | 73/708 |
| 4,414,853 | * | 11/1983 | Bryzek .................................. | 73/766 |
| 4,911,016 | * | 3/1990 | Miyazaki et al. ..................... | 73/766 |
| 5,877,423 | * | 3/1999 | Mattsson ............................... | 73/708 |

FOREIGN PATENT DOCUMENTS

| | | |
|---|---|---|
| 2 497 346 A | 7/1982 | (FR) . |
| 55 163880 A | 3/1981 | (JP) . |
| 62 121302 A | 11/1987 | (JP) . |

* cited by examiner

Primary Examiner—Benjamin R. Fuller
Assistant Examiner—Abdullahi Aw-Musse
(74) Attorney, Agent, or Firm—Weingarten, Schurgin, Gagnebin & Hayes LLP

(57) ABSTRACT

In order to compensate non-linearity in the zero drift of the bridge at very low temperatures, a strain gauge in at least one of the arms of the bridge is in series with a resistor, e.g., a connection lead, of resistance that is much less than that of the strain gauge, and a compensation circuit is connected in parallel with the resistor. The compensation circuit includes a resistive element, e.g., a platinum probe, whose resistance varies as a function of temperature in such a manner as to influence, in the very low temperature range, the resistance of the parallel circuit of which it forms a part, and to do so in a manner that is sensitive to temperature and that increases with decreasing temperature.

15 Claims, 3 Drawing Sheets

PRESSURE SENSOR WITH COMPENSATION FOR NULL SHIFT NON-LINEARITY AT VERY LOW TEMPERATURES

FIELD OF THE INVENTION

The present invention relates to a pressure sensor of the type comprising strain gauges mounted in respective arms of a Wheatstone bridge.

The field to which the invention relates more particularly is that of pressure sensors usable at very low temperatures, typically at temperatures below the boiling rate of nitrogen, and possibly going down to a few Kelvins only.

BACKGROUND OF THE INVENTION

A well-known problem with strain gauge pressure sensors connected as a Wheatstone bridge is that of the zero point of the bridge drifting as a function of temperature.

To resolve that problem, use is generally made of compensation networks connected to the inputs and/or the outputs of the bridge. Those networks which include at least one temperature-sensitive element, are generally designed to provide linear compensation, given that the temperature drift of strain gauge bridges is substantially linear over ordinary temperature ranges.

An additional difficulty arises when the pressure sensors are used at very low temperatures. The temperature drift of strain gauge bridges then becomes non-linear, and the non-linearity increases with decreasing temperature. This can be seen from FIG. 1 which shows how the output voltage from a strain gauge bridge made up of thin film nickel-chromium deposits on a silicon substrate varies as a function of temperature, the bridge being at equilibrium (zero output voltage) at a temperature of 22° C.

Ordinary compensation networks become ineffective, particularly since the thermistors used generally also have resistance that becomes very high and virtually infinite when the temperature drops below −40° C. or −50° C.

The problem which the present invention seeks to resolve is that of compensating the non-linearity of temperature drift, and consequently that of "linearizing" such drift at very low temperatures, in particular at temperatures below the boiling point of nitrogen, i.e. below about −196° C.

BRIEF SUMMARY OF THE INVENTION

The problem is resolved by a pressure sensor in which the strain gauge of at least one of the arms of the bridge is in series with a resistor of resistance that is much less than that of the strain gauge and which is connected in parallel with a compensation circuit comprising a resistive element whose resistance varies as a function of temperature so as to influence the resistance of the resistor with which it is connected in parallel over the very low temperature range in a manner that is substantial and that increases with decreasing temperature.

The resistor having the compensation circuit connected in parallel therewith is of resistance that is much less than that of the strain gauge so as to avoid penalizing the magnitude of the operating range and the sensitivity of the bridge. In the present specification, a resistance that is "much less than" another resistance is less than ½0th or even ¹⁄₁₀₀th or even less of the resistance of a strain gauge.

According to a feature of the pressure sensor of the invention, the compensation circuit is connected in parallel with a resistor formed by a connection lead connecting the strain gauge to one of the corners of the bridge.

Thus, there is no need to modify the bridge in order to connect the compensation circuit thereto. This avoids any instabilities that could be generated if it were necessary to open the bridge for this purpose.

In addition, the circuit for compensating non-linearity can thus be placed very close to the bridge, thereby exposing it to exactly the same temperature conditions as the bridge.

The strain gauges and the connection leads connecting the strain gauges to the corners of the bridge are preferably constituted by deposits of metal on a substrate.

To compensate non-linearity in the very low temperature range, i.e. below −196° C., the resistive element of the compensation circuit must have a resistance such as to have an influence on the resistance of the resistor with which it is connected in parallel, and to do so increasingly with decreasing temperature. To this end, it is preferable for the ratio of the resistance of the resistive element to that of the resistor on which it is connected in parallel to be no greater than 100 when the temperature drops below −196° C., and to decrease thereafter with decreasing temperature. By way of example, such a resistive element can be constituted by a platinum probe.

DETAILED DESCRIPTION OF A PREFERRED EMBODIMENT

Figure 2:
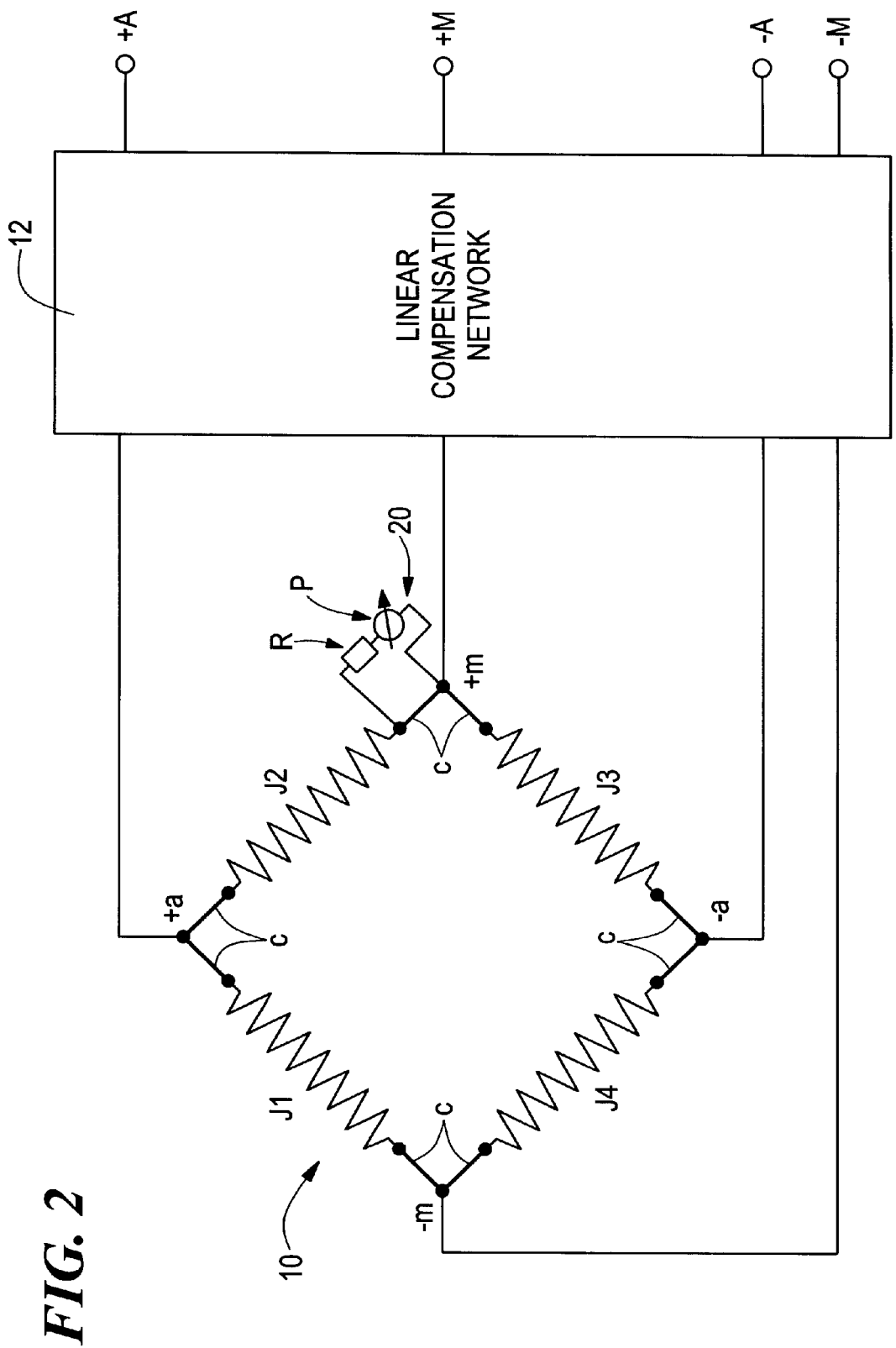
FIG. 2 is an electrical circuit diagram of an embodiment of the pressure sensor of the invention.

FIG. 2 is a circuit diagram of a pressure sensor comprising four strain gauges J1, J2, J3, and J4 inserted in respective ones of the four arms of a Wheatstone bridge 10. Each of the strain gauges J1 to J4 is connected to two adjacent corners of the bridge by connection leads c.

The strain gauges J1 to J4 and the connection leads c are all formed by deposits of metal on a substrate, e.g. a silicon substrate, forming part of the sensitive element of the sensor. In well-known manner, two of the strain gauges in two opposite arms of the bridge are placed on the substrate so as to be extended when the substrate is subjected to a pressure for measurement, while the other two strain gauges are disposed in such a manner as to be subjected to compression.

By way of example, the strain gauges J1 to J4 can be constituted by nickel-chromium deposits that are as identical as possible, while the connection leads c can be constituted, for example, by deposits of gold, likewise as identical as possible.

The deposits are implemented as thin films, e.g. by vacuum sputtering, with the bridge being closed by the resulting deposits.

Two opposite corners +a and −a of the bridge are connected to power supply terminals +A and −A, while the other two corners +m and −m are connected to measurement terminals +M and −M. An interposed compensation network 12 has one side connected to the corners +a, −a, +m, and −m and has its other side connected to the terminals +A, −A, +M, and −M. The compensation network 10 seeks to compensate the linear drift of the pressure sensor as a function of temperature. It is constituted by a resistive network of conventional type, e.g. as described in document FR-A 2 613 833.

A circuit 20 for compensating non-linear zero drift of the bridge is connected in parallel with one of the connection leads c connecting one of the strain gauges of the bridge, e.g. the strain gauge J2, to one of the two corners of the bridge situated at the ends of its arm containing the strain gauge, e.g. the corner +m.

The compensation circuit 20 comprises a resistive element P whose resistance varies as a function of temperature, and in particular in the very low temperature range, i.e., typically, the temperatures lower than the boiling point of nitrogen (−196° C.). An adjustable resistor R can be connected in series with the resistive element P, within the compensation circuit, so as to enable the resulting compensation to be adjusted.

Connecting the resistive element in parallel with a portion of the total resistance of one of the arms of the bridge thus makes it possible to have a non-linear influence on the behavior of the bridge, and thus to compensate for its non-linear drift. When such non-linearity increases with decreasing temperature, then the influence of the resistive element P must increase, i.e. its resistance must decrease, so that the ratio of said resistance to the resistance of a connection lead c becomes no greater than 100 when the temperature drops below −196° C., and decreases as the temperature continues to drop below −196° C. Under such circumstances, a resistive element P is used whose temperature coefficient is positive, for example a platinum probe can be used.

A pressure sensor as shown in FIG. 2 has been made using strain gauges formed by depositing a thin film of nickel-chromium, with each strain gauge having a resistance of 1000Ω at ambient temperature (22° C.). The connection leads c are linear thin-film deposits of gold, each having a resistance of 0.6Ω at 22° C.

Figure 1:
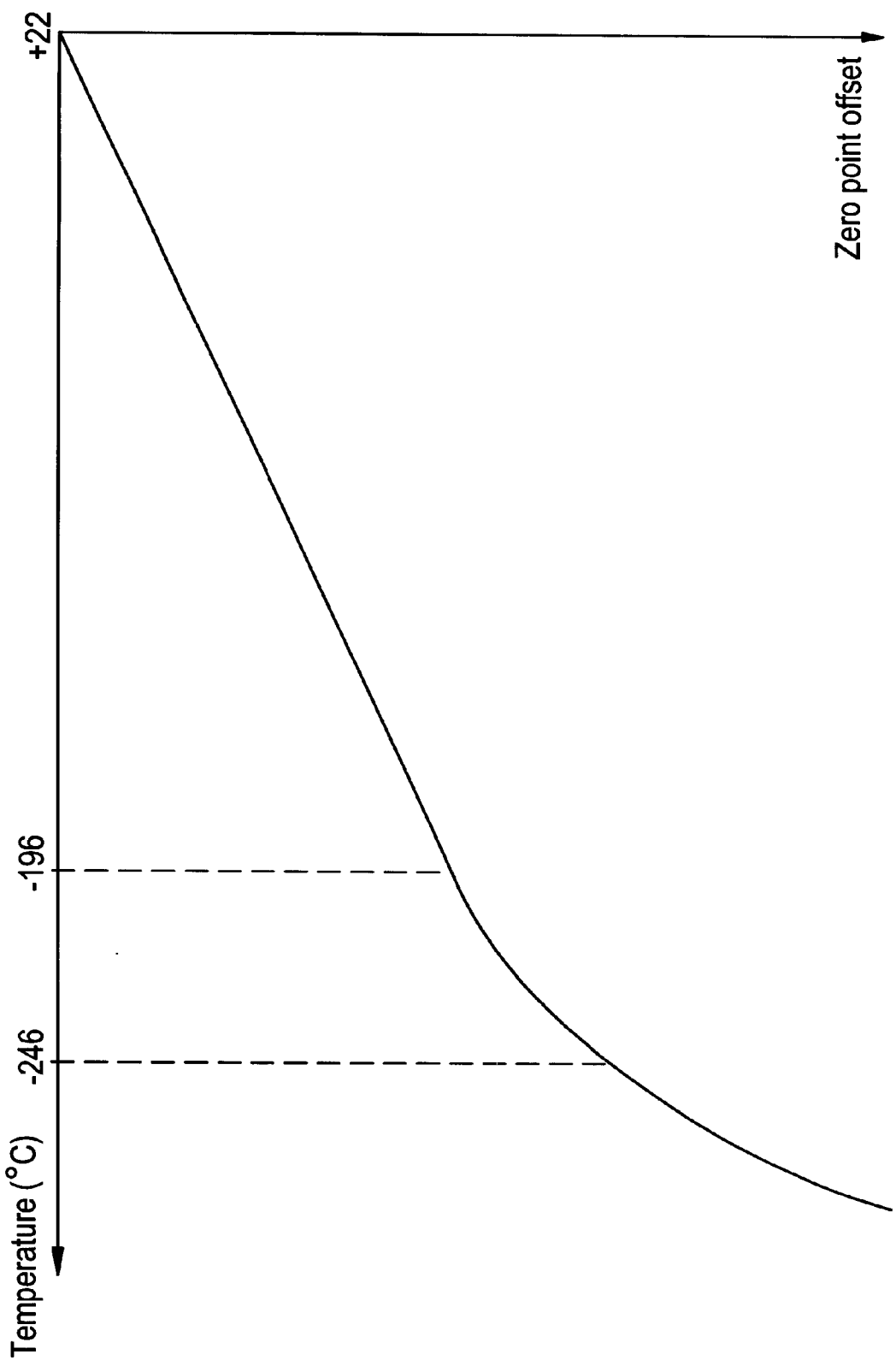
FIG. 1 shows how the zero drift of a pressure sensor constituted by a strain gauge bridge varies as a function of temperature in the absence of drift compensation.

FIG. 1 shows how the voltage picked up across the corners +m and −m of the bridge varies in the absence of any stress being applied to the sensor, and in the absence of the compensation network 12 and the compensation circuit 20, the bridge being in equilibrium (zero output voltage) at 22° C.

It can be seen that the zero drift of the bridge, due essentially to the strain gauges, becomes more and more pronounced as temperature decreases. Down to about −140° C., drift is substantially linear. At lower temperatures, the non-linearity of the drift becomes more and more perceptible.

A compensation circuit constituted by a platinum probe P of resistance equal to 100Ω at 0° C. connected in series with an adjustable resistance R is connected in parallel with the connection lead made of gold that connects the strain gauge J2 to the corner +m of the bridge.

Table 1 below shows the resistances of a connection lead c and of the probe P, while the adjustable resistance R is zero, and it also shows the equivalent resistance of the parallel circuit formed by P and c, at various different temperatures. The ratio of the resistance of the probe P to that of the connection lead c passes from about 47 to about 7.9 over the range −196° C. to −246° C.

TABLE 1

| Resistance/Temperature | Variation in resistance (Ω) | | |
|---|---|---|---|
|  | 22° C. | −196° C. | −246° C. |
| c | 0.6 | 0.426 | 0.383 |
| P | 108 | 20.21 | 3.04 |
| c // P | 0.597 | 0.417 | 0.343 |

Including the compensation circuit 20 causes the zero of the bridge to be offset, and the amount of offset increases with decreasing temperature. Table 2 below gives the value of the offset ΔZ measured as bridge output voltage, while the strain gauges are not subjected to stress (with 800Ω strain gauges, an offset of 6.4Ω in any one strain gauge produces an output voltage of 20 mV when the bridge is powered at 10 V). The various offsets ΔZ given in Table 2 correspond to different values of the compensation circuit and to different temperatures. The rows of the table show that the offset can be attenuated by increasing the resistance R or can be emphasized by decreasing the resistance P (e.g. by placing two 100Ω probes in parallel). The particular compensation circuit that needs to be selected thus depends on the amount of non-linearity that needs to be corrected.

TABLE 2

| Compensation circuit/Temperature | Offset of the bridge zero ΔZ (μV) | | |
|---|---|---|---|
|  | 22° C. | −196° C. | −246° C. |
| R = 0 + P | 9 | 28 | 125 |
| R = 1 Ω + P | 9 | 25 | 104 |
| R = 2 Ω + P | 9 | 23 | 84 |
| R = 5 Ω + P | 9 | 22 | 54 |
| R = 10 Ω + P | 9 | 19 | 34 |
| R = 0 + P//P | 20 | 54 | 241 |

Figure 3:
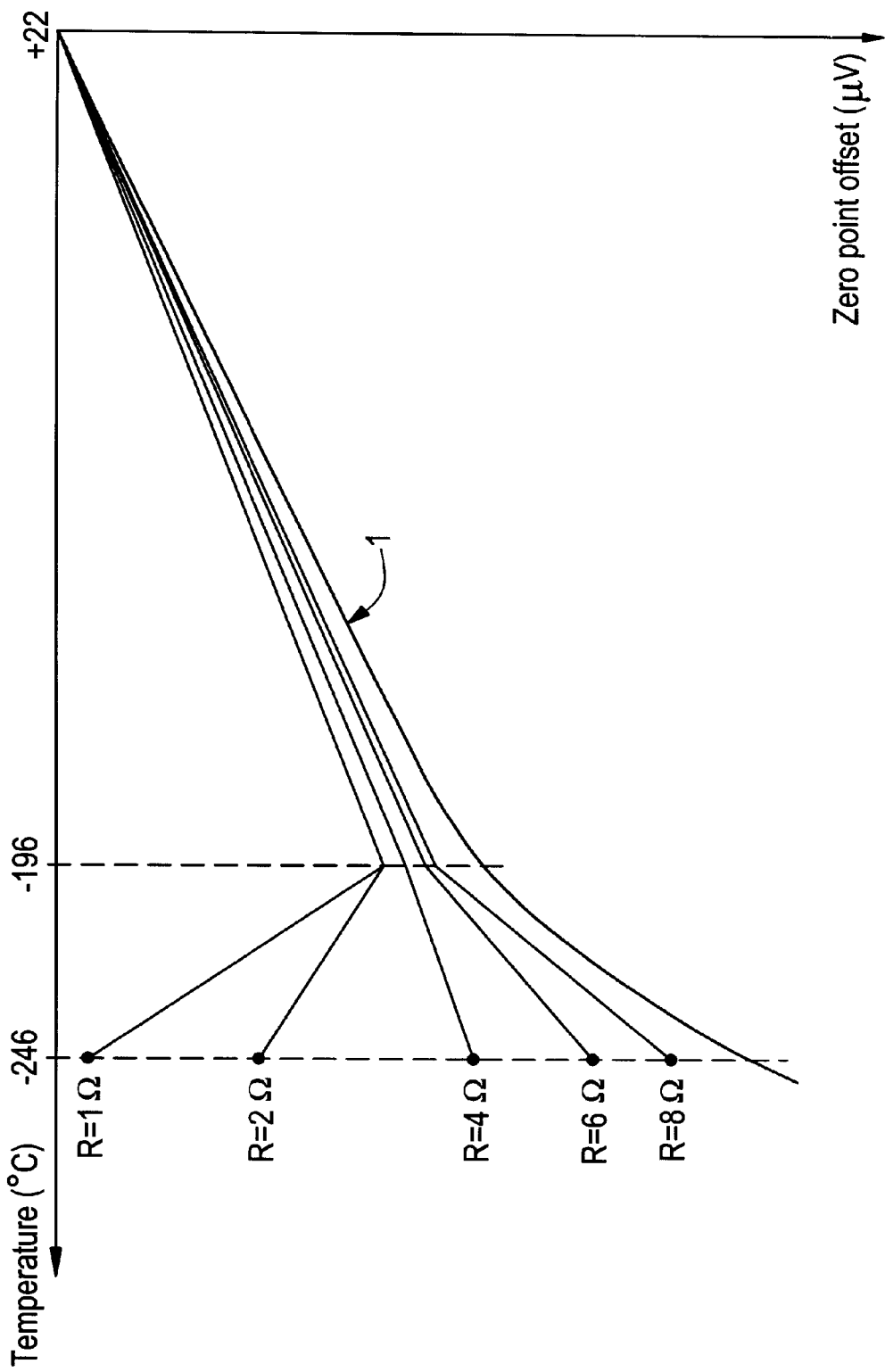
FIG. 3 shows how the zero drift of the FIG. 1 pressure sensor fitted with a circuit for compensating non-linear temperature drift in accordance with the invention varies as a function of temperature.

FIG. 3 shows how the voltage picked up between the corners +m and −m of the bridge varies under the same conditions as for FIG. 1, i.e. no stress on the sensor, bridge at equilibrium at 22° C., and no linear compensation, but with various different compensation circuits 20 having a resistor R in series with two probes P in parallel, each probe P being a platinum probe whose resistance is 100Ω at 0° C.

It can be seen that compared with curve I showing variation in zero drift in the absence of the compensation circuit 20, non-linearity correction becomes increasingly emphasized with decreasing resistance for the resistor R. In this example, when R=4Ω and with two probes P in parallel, the zero drift of the bridge is linearized down to very low temperatures (about −250° C.). The action of the linear compensation network 12 thus makes it possible to compensate for the temperature drift of the bridge zero completely, all the way from ambient temperature to very low temperatures (a few Kelvins).

In the above, a circuit for compensating non-linear drift is described as being connected in parallel with one of the connection leads connecting a strain gauge in one of the arms of the bridge to a corner of the bridge. The same effect can be achieved by connecting a non-linear drift compensation circuit in parallel with one and/or both of the connection leads of this arm of the bridge and/or in parallel with one and/or both of the connection leads of the opposite arm.

In FIG. 1, non-linearity varies in the same direction as the linear component of the drift and it makes it worse, however under other circumstances, non-linearity could vary in the opposite direction. Depending on the direction of this variation, the compensation circuit should be connected either to one or both of a first pair of opposite arms of the bridge, or else to one and/or both of the other two opposite arms of the bridge.

What is claimed is:

1. A pressure sensor comprising;
strain gauges mounted in respective arms of a Wheatstone bridge;
linear compensation means for compensating a zero drift of the bridge as a function of temperature;
a resistor of resistance that is much lower than that of the strain gauge in series with the strain gauge in at least one of the arms of the bridge; and
a low temperature compensation circuit connected in parallel with the resistor, said low temperature compensation circuit comprising a resistive element whose resistance varies as a function of temperature in such a manner as to influence the resistance of the low temperature compensation circuit in a very low temperature range down to approximately −250° C. in a manner that is substantial and that increases with decreasing temperature in order to compensate for non-linearity in the zero drift at said very low temperature range.

2. A sensor according to claim 1, wherein the low temperature compensation circuit is connected in parallel with said resistor constituted by a connection lead connecting the strain gauge to a corner of the bridge.

3. A sensor according to claim 2, wherein the strain gauges and the connection leads connecting the strain gauges to the corners of the bridge are constituted by deposits of metal on a substrate.

4. A sensor according to claim 3, wherein the connection leads are made of gold.

5. A sensor according to claim 1, wherein the ratio of the resistance of said resistive element to the resistance of the resistor with which said resistive element is connected in parallel is no greater than 100 when the temperature drops below −196° C., and thereafter decreases with decreasing temperature.

6. A sensor according to claim 1, wherein said resistive element is constituted by at least one platinum probe.

7. A sensor according to claim 1, wherein said low temperature compensation circuit includes an adjustable resistor connected in series with said resistive element.

8. A sensor according to claim 2, wherein the ratio of the resistance of said resistive element to the resistance of the resistor with which said resistive element is connected in parallel is no greater than 100 when the temperature drops below −196° C., and thereafter decreases with decreasing temperature.

9. A sensor according to claim 2, wherein said resistive element is constituted by at least one platinum probe.

10. A sensor according to claim 5, wherein said resistive element is constituted by at least one platinum probe.

11. A sensor according to claim 2, wherein said low temperature compensation circuit includes an adjustable resistor connected in series with said resistive element.

12. A sensor according to claim 5, wherein said low temperature compensation circuit includes an adjustable resistor connected in series with said resistive element.

13. A pressure sensor comprising;
strain gauges mounted in respective arms of a Wheatstone bridge;
linear compensation means for compensating a zero drift of the bridge as a function of temperature;
a resistor of resistance that is much lower than that of the strain gauge in series with the strain gauge in at least one of the arms of the bridge; and
a low temperature compensation circuit connected in parallel with the resistor, said low temperature compensation circuit comprising a resistive element whose resistance varies as a function of temperature in such a manner as to influence the resistance of the low temperature compensation circuit in a very low temperature range down to approximately −250° C. in a manner that is substantial and that increases with decreasing temperature in order to compensate for non-linearity in the zero drift at said very low temperature range, wherein the ratio of the resistance of said resistive element to the resistance of the resistor with which said resistive element is connected in parallel is no greater than 100 when the temperature drops below −196° C., and thereafter decreases with decreasing temperature.

14. A pressure sensor comprising;
strain gauges mounted in respective arms of a Wheatstone bridge;
linear compensation means for compensating a zero drift of the bridge as a function of temperature;
a resistor of resistance that is much lower than that of the strain gauge in series with the strain gauge in at least one of the arms of the bridge; and
a low temperature compensation circuit connected in parallel with the resistor, said low temperature compensation circuit comprising a resistive element whose resistance varies as a function of temperature in such a manner as to influence the resistance of the low temperature compensation circuit in a very low temperature range down to approximately −250° C. in a manner that is substantial and that increases with decreasing temperature in order to compensate for non-linearity in the zero drift at said very low temperature range, wherein the ratio of the resistance of said resistive element to the resistance of the resistor with which said resistive element is connected in parallel is no greater than 100 when the temperature drops below −196° C., and thereafter decreases with decreasing temperature said resistive element is constituted by at least one platinum probe.

15. A pressure sensor comprising;
strain gauges mounted in respective arms of a Wheatstone bridge;
linear compensation means for compensating a zero drift of the bridge as a function of temperature;
a resistor of resistance that is much lower than that of the strain gauge in series with the strain gauge in at least one of the arms of the bridge; and
a low temperature compensation circuit connected in parallel with the resistor, said low temperature compensation circuit comprising a resistive element whose resistance varies as a function of temperature in such a manner as to influence the resistance of the low temperature compensation circuit in a very low temperature range down to approximately −250° C. in a manner that is substantial and that increases with decreasing temperature in order to compensate for non-linearity in the zero drift at said very low temperature range, wherein the ratio of the resistance of said resistive element to the resistance of the resistor with which said resistive element is connected in parallel is no greater than 100 when the temperature drops below −196° C., and thereafter decreases with decreasing temperature and said low temperature compensation circuit includes an adjustable resistor connected in series with said resistive element.

* * * * *